United States Patent
Zhong et al.

(10) Patent No.: US 10,582,295 B1
(45) Date of Patent: Mar. 3, 2020

(54) BONE CONDUCTION SPEAKER FOR HEAD-MOUNTED WEARABLE DEVICE

(71) Applicant: AMAZON TECHNOLOGIES, INC., Seattle, WA (US)

(72) Inventors: Xuan Zhong, Mountain View, CA (US); Jung Sik Yang, Cupertino, CA (US); Zhen Xu, Santa Clara, CA (US); Chun Sik Jeong, Los Gatos, CA (US); Jianchun Dong, Palo Alto, CA (US); Han Zhang, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/385,757

(22) Filed: Dec. 20, 2016

(51) Int. Cl.
  *H04R 1/02* (2006.01)
  *H04R 1/28* (2006.01)
  (Continued)

(52) U.S. Cl.
  CPC ....... *H04R 1/2876* (2013.01); *G02B 27/0176* (2013.01); *H04R 1/028* (2013.01);
  (Continued)

(58) Field of Classification Search
  CPC ........ G02C 11/06; G02C 5/143; H04R 1/105; H04R 1/2876; H04R 1/028; H04R 1/46; H04R 2420/07; H04R 2460/13; H04R 25/405; H04R 25/407; H04R 25/604; H04R 2225/43; H04R 2225/41; H04R 2460/01; H04R 2430/21; G02B 27/0176; G02B 2027/0163; G10L 13/043; G10L 21/0208
  USPC ........ 381/312–330, 74, 23.1, 309, 150, 151, 381/337, 339, 345, 253, 354, 162, 364, 381/365, 366, 367, 368, 178, 179, 370,
  (Continued)

(56) References Cited

U.S. PATENT DOCUMENTS

| | | | | |
|---|---|---|---|---|
| 3,030,456 A | * | 4/1962 | Knauert | H04R 11/00 381/326 |
| 3,091,020 A | * | 5/1963 | Strzalkowski | G02C 11/06 174/535 |
| 4,383,139 A | * | 5/1983 | Kanchev | H04R 19/02 381/191 |
| 9,482,882 B1 | | 11/2016 | Hanover et al. | |
| 2008/0273731 A1 | * | 11/2008 | Giannetti | H04R 1/46 381/327 |
| 2010/0220886 A1 | * | 9/2010 | Grundy | H04R 1/1016 381/381 |
| 2013/0051585 A1 | * | 2/2013 | Karkkainen | H04R 1/1075 |

OTHER PUBLICATIONS

Burtscher, et al., "Mechanical Aspects of High Damping Rubber", University of Applied Sciences, Institute of Structural Engineering, A-1190 Vienna, 2nd Int. PhD Symposium in Civil Engineering 1998 Budapest; Retrieved from: https://www.researchgate.net/profile/Stefan_Burtscher/publication/2441970_Mechanical_Aspects_Of_High_Damping_Rubber/links/562f74a008ae0077ccc9a3a8.pdf.

Primary Examiner — Leshui Zhang
(74) Attorney, Agent, or Firm — Lindauer Law, PLLC

(57) ABSTRACT

A head-mounted wearable device (HMWD) includes a bone conduction speaker (BCS) to provide audio output to a user wearing the HMWD. The BCS may be mounted within a recess of a temple of the HMWD. During wear a portion of the BCS is in physical contact with a head of the user. In one implementation, a head contact piece may be mounted to the side of the BCS that is proximate to the head. The head contact piece is contoured to maximize the contact area with the head, and may have a cross section that is approximately wedge shaped, with a thicker portion of the wedge proximate to the front of the HMWD. The BCS may include low damping elements to provide protection to the BCS from damage and improve performance, as well as high damping elements to reduce the transfer of vibrations from the BCS to the temple.

20 Claims, 9 Drawing Sheets

(51) Int. Cl.
  *H04R 17/00*  (2006.01)
  *H04R 1/46*  (2006.01)
  *G02B 27/01*  (2006.01)
(52) U.S. Cl.
  CPC ............... *H04R 1/46* (2013.01); *H04R 17/00* (2013.01); *G02B 2027/0163* (2013.01); *H04R 2420/07* (2013.01); *H04R 2460/13* (2013.01)
(58) Field of Classification Search
  USPC ....... 381/372, 374, 376, 382, 383, 385, 386, 381/395, 190, 191, 410, 411, 327; 455/569.1, 575.2; 700/94
  See application file for complete search history.

(56) References Cited

U.S. PATENT DOCUMENTS

| | | | | |
|---|---|---|---|---|
| 2013/0308798 | A1* | 11/2013 | Lee | H04M 1/03 381/151 |
| 2014/0064536 | A1* | 3/2014 | Kim | G02B 27/017 381/333 |
| 2015/0268673 | A1* | 9/2015 | Farzbod | G02B 27/0176 700/280 |
| 2016/0044395 | A1* | 2/2016 | Fukuda | B06B 1/045 381/151 |
| 2016/0066082 | A1* | 3/2016 | Fujise | H04R 1/2888 381/351 |

* cited by examiner

BONE CONDUCTION SPEAKER FOR HEAD-MOUNTED WEARABLE DEVICE

BACKGROUND

Wearable devices provide many benefits to users, allowing easier and more convenient access to information and services. Wearable devices provide output that is audible to the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
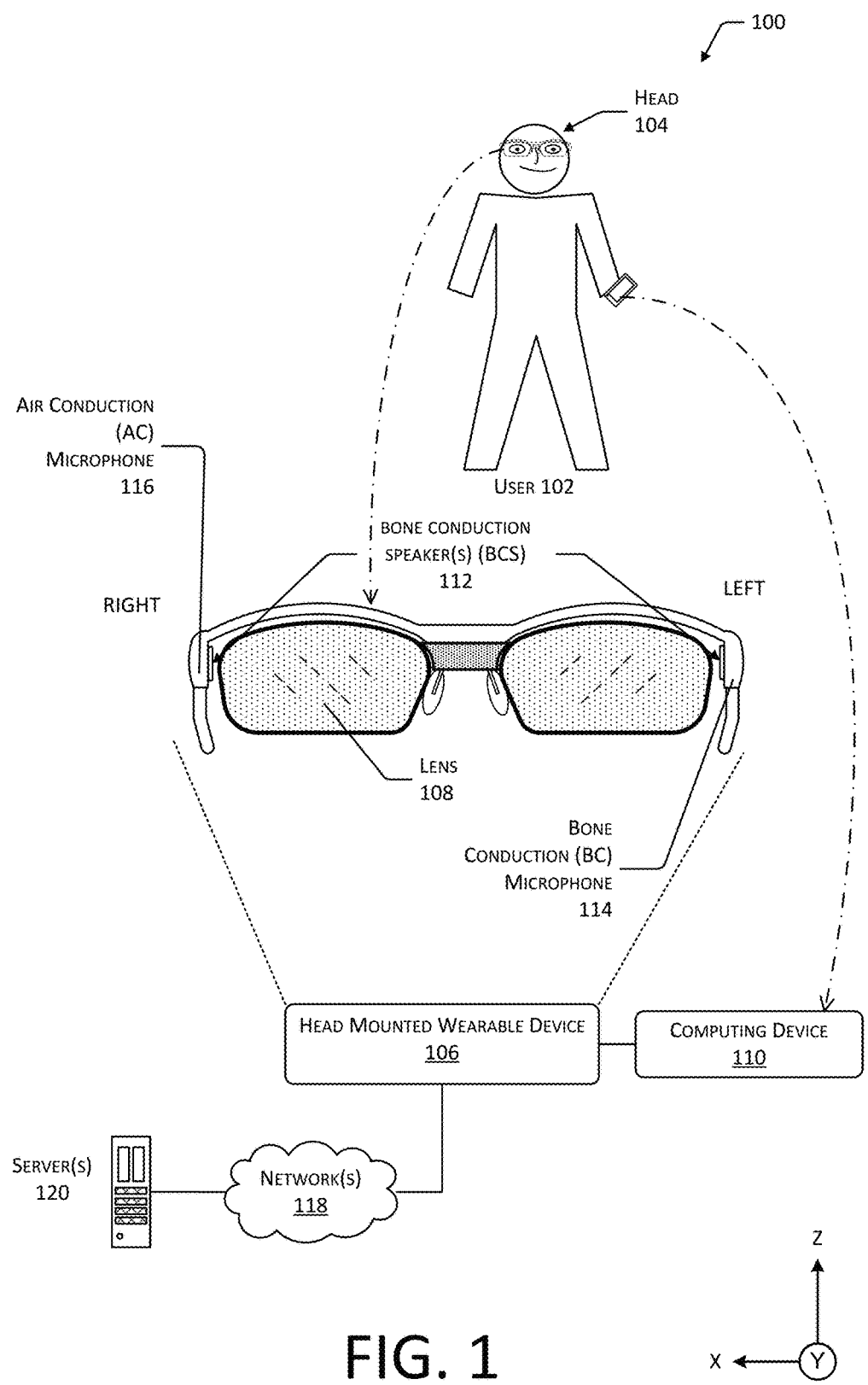
FIG. 1 depicts a system including a head-mounted wearable device equipped with bone conduction speakers (BCS), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor that is ubiquitous and easily worn, such as eyeglasses, may facilitate access to information.

The HMWD may utilize one or more different types of output devices, including a bone conduction speaker (BCS). The BCS allows audio output to be provided to a user of the HMWD with little or no audio being presented to the surrounding environment and bystanders.

Described in this disclosure is a BCS and various techniques for mounting the BCS and improving the physical coupling between the BCS and a user's head. The temple of the HMWD may have a speaker recess, within which the BCS is emplaced. The BCS may include several layers, including an outer plate that has a pillar which is in contact with a piezoelectric element.

In one implementation the BCS may operate in a bending mode. In this bending mode, application of an electric signal results in the bending of at least a portion of the piezoelectric element. In this bending mode, the center of the piezoelectric element and the ends vibrate out of phase with one another. As a result, the user may feel a vibro-tactile sensation that may be distracting.

The piezoelectric element is affixed to a high damping element that in turn is affixed to an inner plate. The high damping element attenuates the transfer of vibrations between the temple and the BCS. Low damping elements, such as one or more pieces of acoustic foam, may be positioned between the various elements of the BCS. For example, acoustic foam may be placed between the outer plate and the piezoelectric element, between the piezoelectric element and the inner plate, and so forth. The use of the low damping element provides mechanical support to the entire structure, making the BCS more robust. The low damping element also broadens the resonance peak of the piezoelectric element, improving the quality of the audio output.

The BCS provides best performance when there is sufficient mechanical coupling with a portion of the user's head. However, different users may exhibit different head shapes. To improve mechanical coupling between the BCS and different head shapes, a head contact piece may be affixed to the outer plate of the BCS. The head contact piece may be wedge shaped, having a thicker end and tapering to a thinner end. The thickest part of the wedge may be positioned towards the front of the BCS, closest to the front of the HMWD. The head contact pieces may be removeable or adjustable to accommodate different shapes of head. For example, magnets may be used to join the head contact piece to the BCS. The head contact piece may comprise an elastomeric material that conforms at least partially to the contour of the head.

Use of the head contact piece also reduces the vibro-tactile effects on the user, and minimizes leakage of audio into the surrounding environment. As mentioned above, because the ends of the piezoelectric element and the center of the piezoelectric element are out of phase with one another during operation, the damping attenuates the vibration from the ends of the piezoelectric element, reducing leakage and vibro-tactile effects.

By utilizing the structures described herein, the HMWD is able to provide improved audio output using the BCS. For example, the low damping elements improve the quality of the audio provided to the user. Additionally, with the improved mechanical coupling afforded by the head contact piece, desired levels of audio output may be provided using less electrical power. As a result, battery life of the HMWD may be improved.

Illustrative System

FIG. 1 depicts a system 100 in which a user 102 is wearing on their head 104 a head-mounted wearable device (HMWD) 106 in a general form factor of eyeglasses. The HMWD 106 may include one or more lenses 108. The lenses 108 may be shaped to provide a particular refractive effect on light rays. The lenses 108 may provide other functionality as well. For example, the lenses 108 may act as a surface onto which an image may be presented from an electronic display.

The HMWD 106 may be in communication with one or more affiliated computing devices 110. For example, the HMWD 106 may communicate with the computing device 110 using a personal area network (PAN) such as Bluetooth. The computing device 110 may be used at least in part to provide additional resources, such as access to a network, compute resources, storage, display output, and so forth. The computing devices 110 may comprise a smart phone, tablet, local server, in vehicle computer system, and so forth. For example, the computing device 110 may comprise a smart phone that includes a display. The display of the smart phone may be used to present a graphical user interface.

The HMWD 106 may deliver audio output to the user 102, such as communication audio from a telephone call, entertainment content, navigational directions, earcons, and so forth. To provide audio output to the user 102, the HMWD 106 may include one or more bone conduction speakers (BCSs) 112. The BCS 112 generates a mechanical vibration that, when imparted to the head 104 of the user 102, is perceived by the user 102 as audio. The BCS 112 may include an electrically moveable element that, responsive to an electrical signal, provides mechanical motion. For example, the electrically moveable element may comprise a piezoelectric material, an electromagnetic coil such as a voice coil or solenoid, an electroactive polymer, and so forth. The BCS 112 may be placed within the HMWD 106 such that, during normal wear, a portion of the BCS 112 is in contact with the temporal bone of the head 104. In other implementations, the BCS 112 may be in contact with other portions of the user's head 104 or body, such as the torso. In some implementations the BCS 112 may be used as an input device. For example, mechanical vibrations of the head 104 may produce electrical signals in the electrically moveable element. Continuing the example, the BCS 112 may be operated as a bone conduction microphone.

The HMWD 106 may obtain input using a BC microphone 114 that is responsive to the vibrations produced by the user 102, such as while vocalizing. The BC microphone 114 may comprise a voice coil, microelectromechanical system (MEMS) element, and so forth that generates data in response to mechanical displacement. For example, the BC microphone 114 may comprise an accelerometer. The BC microphone 114 may be arranged to be in contact with the skin above a bony or cartilaginous structure. For example, a portion of the temple of the HMWD 106 may be mechanically coupled to the BC microphone 114 such that vibrations of the temporal bone or other structures upon which the head to contact piece rests are transmitted to the BC microphone 114. In another example, where the HMWD 106 is in the form of eyeglasses, nose pads of a nosepiece may be mechanically coupled to the BC microphone 114. In other implementations, the BC microphone 114 may be located elsewhere with respect to the HMWD 106, or worn elsewhere by the user 102.

The HMWD 106 may obtain input using an AC microphone 116. The AC microphone 116 may comprise a diaphragm, MEMS element, or other elements that generate data in response to the displacement of air by sound waves. Air conduction microphone data may be generated that is indicative of the sound detected by the AC microphone 116. In some implementations, the HMWD 106 may include a plurality of AC microphones 116. For example, a pair of AC microphones 116 may be operated in conjunction. Continuing the example, beamforming techniques may be used to provide some degree of gain or directionality, such that audio uttered by the user 102 may be acquired while reducing the effect of noise in the ambient environment. In another example, the first AC microphone 116 may exhibit a particular frequency response while the second AC microphone 116 exhibits a different frequency response.

The AC microphone 116 may utilize one or more AC microphone ports as described in the next figure. The AC microphone ports provide an entry for vibrations from the medium that is carrying the sound, such as the air in the ambient environment, that is to be detected by the AC microphone 116. These microphone ports may comprise apertures in a housing or cover, one or more channels, or choose to direct the vibrations to the AC microphone 116, and so forth.

The HMWD 106 may be in communication with the other devices via one or more networks 118. For example, the network 118 may comprise a personal area network, local area network, metropolitan area network, wide area network, and so forth. The HMWD 106 may use the networks 118 to access one or more services that are provided by the other devices. For example, the HMWD 106 may establish communication with one or more servers 120. These one or more servers 120 may provide one or more services, such as automated speech recognition, information retrieval, messaging, and so forth.

The structures depicted in this and the following figures are not necessarily according to scale. Furthermore, the proportionality of one component to another may change with different implementations. In some illustrations, the size of one structure may be exaggerated with respect to another to facilitate illustration, and not necessarily as a limitation.

The objects described herein may be affixed to one another using one or more of mechanical interference fits, fasteners, adhesives, welding, and so forth. The affixation of one object to another, or one portion of an object to another, may be reversible or not. For example, a mechanical interference fit may include a tab that cannot be released once it has been engaged. It is understood, that these various techniques to fix one object to another may be used in various combinations with one another.

Figure 2:
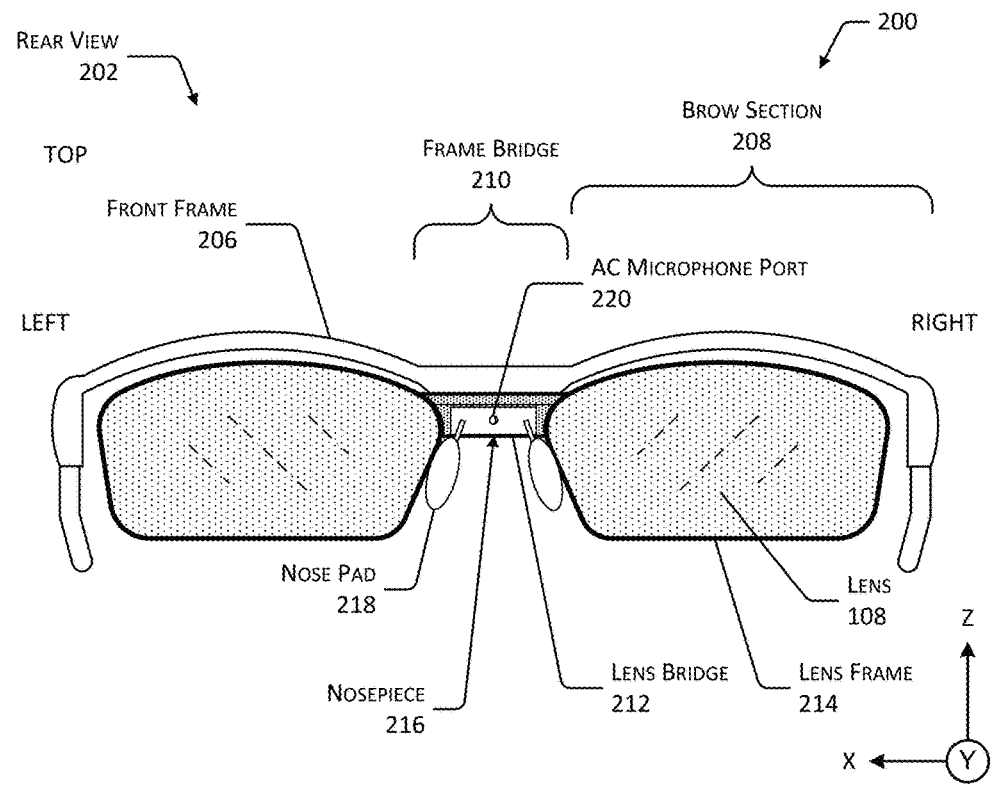
FIG. 2 depicts views of a head-mounted wearable device, according to some implementations.
Figure 2:
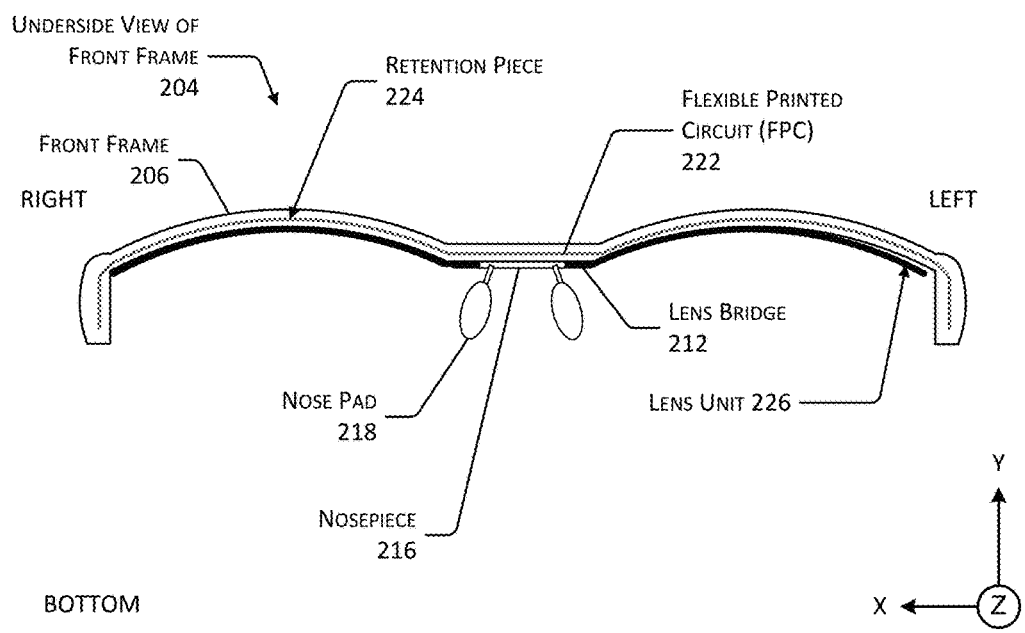

FIG. 2 depicts views 200 of the HMWD 106, according one implementation. A rear view 202 shows the exterior appearance of the HMWD 106 while an underside view 204 shows selected components of the HMWD 106.

In the rear view 202, a front frame 206 is depicted. The front frame 206 may include a left brow section 208(L) and a right brow section 208(R) that are joined by a frame bridge 210. In some implementations, the front frame 206 may comprise a single piece of material, such as a metal, plastic, ceramic, composite material, and so forth. For example, the front frame 206 may comprise 6061 aluminum alloy that has been milled to the desired shape. In another example, the front frame 206 may comprise injection molded plastic. In other implementations, the front frame 206 may comprise several discrete pieces that are joined together by way of mechanical engagement features, welding, adhesive, and so forth.

A lens bridge 212 may be located between the left lens 108(L) and the right lens 108(R). The lens bridge 212 is depicted here as joining a left lens frame 214 and a right lens frame 214.

The lens bridge 212 may be mounted to the frame bridge 210. A nosepiece 216 may be affixed to the lens bridge 212. One or more nose pads 218 may be affixed to, or integral with, the nosepiece 216. The nose pads 218 aid in the support of the front frame 206 and may improve comfort of the user 102.

The nosepiece 216 may include an air conduction (AC) microphone port 220. The AC microphone port 220 may comprise a passageway or hole through the nosepiece 216, that allows sound vibrations to be conveyed to an AC microphone 116 located within the frame bridge 210.

As described above, the lens frames 214 may be used to retain lenses 108. The lenses 108 may have specific refractive characteristics, such as in the case of prescription lenses. The lenses 108 may be clear, tinted, photochromic, electrochromic, and so forth. For example, the lenses 108 may comprise plano (non-prescription) tinted lenses to provide protection from the sun. In some implementations, only a single lens 108 may be installed.

The underside view 204 depicts the front frame 206. One or more electrical conductors, optical fibers, transmission lines, and so forth, may be used to connect various components of the HMWD 106. In this illustration, arranged within a channel is a flexible printed circuit (FPC) 222. The FPC 222 allows for an exchange of electrical signals, optical signals, radio signals, power, and so forth, between devices in the HMWD 106. For example, the FPC 222 may be used to provide connections for electrical power and data communications between electronics in one or both of the temples of the HMWD 106.

A retention piece 224 may be placed between the FPC 222 within the channel and the exterior environment. The retention piece 224 may comprise a single piece or several pieces. The retention piece 224 may comprise an overmolded component, a channel seal, a channel cover, and so forth. For example, the material comprising the retention piece 224 may be formed into the channel while in one or more of a powder, liquid or semi-liquid state. The material may subsequently harden into a solid or semi-solid shape. Hardening may occur as a result of time, application of heat, light, electric current, and so forth. In another example, the retention piece 224 may be affixed to the channel or a portion thereof using adhesive, pressure, and so forth. In yet another example, the retention piece 224 may be formed within the channel using an additive technique, such as using an extrusion head to deposit a plastic or resin within the channel, a laser to sinter a powdered material, and so forth. In still another example, the retention piece 224 may comprise a single piece produced using injection molding techniques. In some implementations, the retention piece 224 may comprise an overmolded piece. The FPC 222 may be maintained within the channel by the retention piece 224. The retention piece 224 may also provide devices within the channel with protection from environmental contaminants such as dust, water, and so forth.

The retention piece 224 may be sized to retain the FPC 222 within the channel. The retention piece 224 may include one or more engagement features. The engagement features may be used to facilitate retention of the retention piece 224 within the channel of the front frame 206. For example, the distal ends of the retention piece 224 may include protrusions configured to engage a corresponding groove or receptacle within a portion of the front frame 206. Instead of, or in addition to the engagement features, an adhesive may be used to bond at least a portion of the retention piece 224 to at least a portion of the channel in the front frame 206.

The retention piece 224 may comprise a single material, or a combination of materials. The material may comprise one or more of an elastomer, a polymer, a ceramic, a metal, a composite material, and so forth. The material of the retention piece 224 may be rigid or elastomeric. For example, the retention piece 224 may comprise a metal or a resin. In implementations where the retention piece 224 is rigid, a retention feature such as a tab or slot may be used to maintain the retention piece 224 in place in the channel of the front frame 206. In another example, the retention piece 224 may comprise a silicone plastic, a room temperature vulcanizing rubber, or other elastomer.

A lens unit 226 may comprise one or more of the lens bridge 212, the lens frames 214, the nosepiece 216, the nose pads 218, or the lenses 108. The lens unit 226 may be joined to the front frame 206. For example, screws may secure the lens bridge 212 to the frame bridge 210.

One or more components of the HMWD 106 may comprise single unitary pieces or may comprise several discrete pieces. For example, the front frame 206, the nosepiece 216, the lens unit 226, and so forth, may comprise a single piece, or may be constructed from several pieces joined or otherwise assembled.

Figure 3:
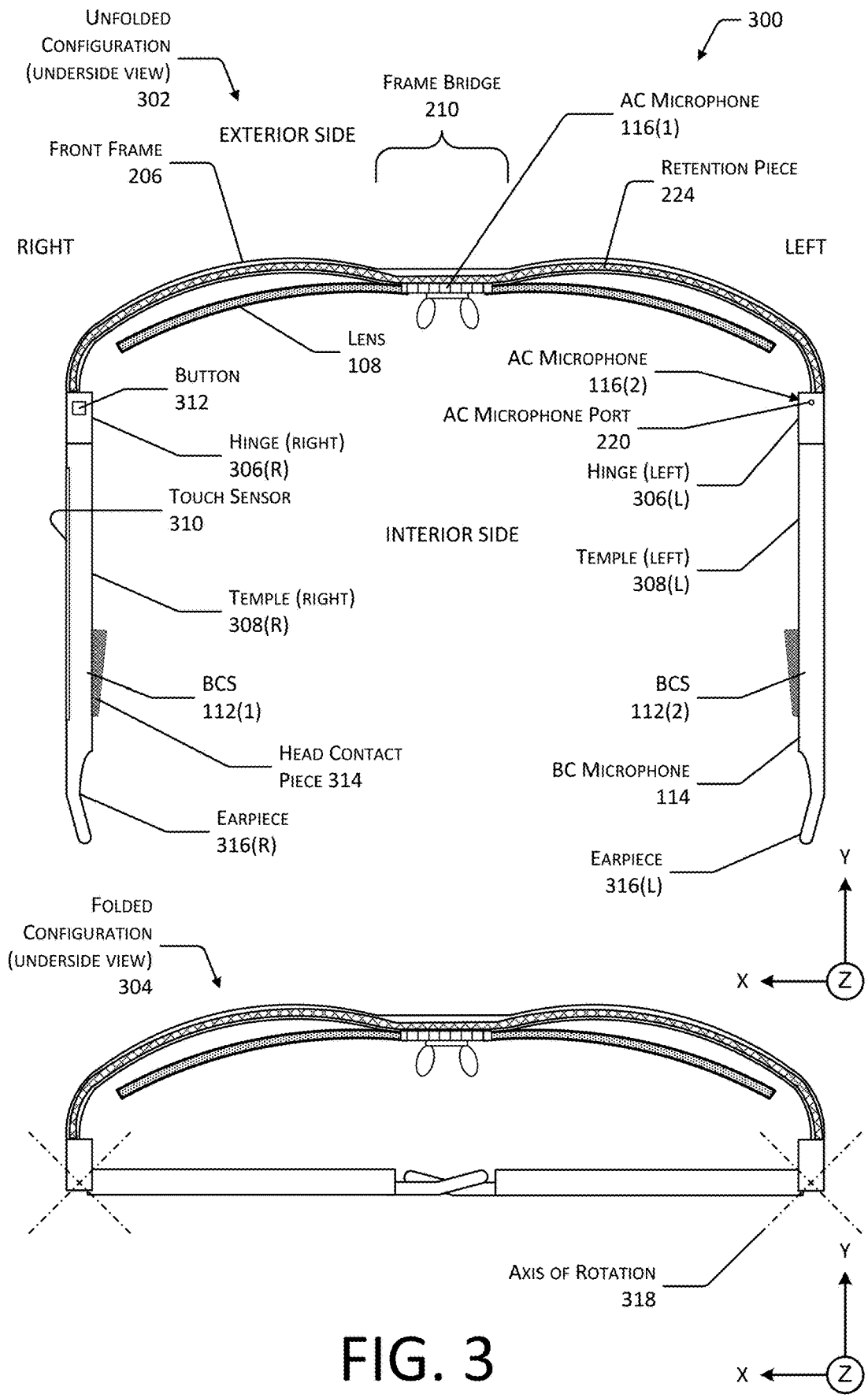
FIG. 3 depicts exterior views, from below, of the head-mounted wearable device in an unfolded and folded configuration, according to some implementations.

FIG. 3 depicts exterior views 300, from below looking up, of the HMWD 106, including a view in an unfolded configuration 302 and a view in a folded configuration 304, according to some implementations. The retention piece 224 that is placed within a channel of the front frame 206 is visible in this view from underneath the HMWD 106.

Also, visible in this view are the lenses 108 of the lens unit 226. Because the lens unit 226 is affixed to the front frame 206 at the frame bridge 210, the front frame 206 may flex without affecting the positioning of the lenses 108 with respect to the eyes of the user 102. For example, when the head 104 of the user 102 is relatively large, the front frame 206 may flex away from the user's head 104 to accommodate the increased distance between the temples. Similarly, when the head 104 of the user 102 is relatively small, the front frame 206 may flex towards the user's head 104 to accommodate the decreased distance between the temples.

One or more hinges 306 may be affixed to, or an integral part of, the front frame 206. Depicted are a left hinge 306(L) and a right hinge 306(R) on the left and right sides of the front frame 206, respectively. The left hinge 306(L) is arranged at the left brow section 208(L), distal to the frame bridge 210. The right hinge 306(R) is arranged at the right brow section 208(R) distal to the frame bridge 210.

A temple 308 may couple to a portion of the hinge 306. For example, the temple 308 may comprise one or more components, such as a knuckle, that mechanically engage one or more corresponding structures on the hinge 306.

The left temple 308(L) is attached to the left hinge 306(L) of the front frame 206. The right temple 308(R) is attached to the right hinge 306(R) of the front frame 206.

The hinge 306 permits rotation of the temple 308 with respect to the hinge 306 about an axis of rotation 318. The hinge 306 may be configured to provide a desired angle of rotation. For example, the hinge 306 may allow for a rotation of between 0 and 120 degrees. As a result of this rotation, the HMWD 106 may be placed into a folded configuration, such as shown at 304. For example, each of the hinges 306 may rotate by about 90 degrees, such as depicted in the folded configuration 304.

One or more of the front frame 206, the hinge 306, or the temple 308 may be configured to dampen the transfer of vibrations between the front frame 206 and the temples 308. For example, the hinge 306 may incorporate vibration damping structures or materials to attenuate the propagation of vibrations between the front frame 206 and the temples 308. These vibration damping structures may include elastomeric materials, springs, and so forth. In another example, the portion of the temple 308 that connects to the hinge 306 may comprise an elastomeric material.

One or more different sensors may be placed on the HMWD 106. For example, an AC microphone 116 may be located at the frame bridge 210 while a second AC microphone 116 may be emplaced within or proximate to the left hinge 306(L), such as on the underside of the left hinge 306(L). The BC microphone 114 and the AC microphones 116 are maintained at a fixed distance relative to one another during operation. For example, the relatively rigid frame of the HMWD 106 maintains the spacing between the BC microphone 114 and the AC microphone 116. While the AC microphone 116 is depicted proximate to the frame bridge 210, in other implementations, the BC microphone 114 may be positioned at the frame bridge 210.

As described above, the AC microphone 116 may comprise a diaphragm, MEMS element, or other elements that move in response to the displacement of air by sound waves. Air conduction microphone data may be generated that is indicative of the sound detected by the AC microphone 116.

As described above, the BC microphone 114 is responsive to the vibrations produced by the user 102, such as while speaking. The BC microphone 114 may be arranged to be in contact with the skin above a bony or cartilaginous structure. For example, where the HMWD 106 is in the form of eyeglasses, nose pads 218 of a nosepiece 216 may be mechanically coupled to the BC microphone 114 such that vibrations of the nasal bone, *glabella*, or other structures upon which the nose pads may rest are transmitted to the BC microphone 114. In other implementations, the BC microphone 114 may be located elsewhere with respect to the HMWD 106, or worn elsewhere by the user 102. For example, the BC microphone 114 may be incorporated into the temple 308 of the HMWD 106, a hat or headband.

A touch sensor 310 may be located on one or more of the temples 308. For example, the touch sensor 310 may comprise a capacitive touch sensor, a force sensitive resistor touch sensor, an optical touch sensor, and so forth. Touch sensor data may be generated that is indicative of the location, direction, duration and so forth of the touch.

One or more buttons 312 may be placed in other locations on the HMWD 106. For example, a button 312 may be emplaced within, or proximate to, the right hinge 306(R), such as on an underside of the right hinge 306(R).

One or more bone conduction speakers (BCS) 112 may be emplaced on the temples 308. For example, as depicted here, a BCS 112 may be located on the surface of the temple 308 that is proximate to the head 104 of the user 102 during use. In some implementations, the BCS 112 may be used to provide the functionality of the BC microphone 114. For example, the BCS 112 may be used to detect vibrations of the user's 102 head 104.

A head contact piece 314 may be affixed to, or part of, the BCS 112. The BCS 112 provides best performance when there is sufficient mechanical coupling with a portion of the head 104 of the user 102. However, different users 102 may exhibit different head shapes. To improve mechanical coupling between the BCS 112 and different head shapes, a head contact piece 314 may be affixed to the BCS 112. In one implementation, the head contact piece 314 may be wedge shaped, having a thicker end and tapering to a thinner end. The thickest part of the wedge may be positioned towards the front of the BCS 112, closest to the front of the HMWD 106. In other implementations, the head contact piece 314 may exhibit other shapes. For example, the head contact piece 314 may be concave.

The head contact piece 314 may be removeable or adjustable to accommodate different shapes of head. For example, magnets may be used to join the head contact piece 314 to the BCS 112. In another example, one or more of the BCS 112 or the head contact piece 314 may include a magnetically receptive material that are attracted to magnets on the opposing structure.

The head contact piece 314 may comprise an elastomeric material that conforms at least partially to the contour of the head 104. For example, the head contact piece 314 may comprise one or more thermoplastic elastomers exhibiting a Shore hardness of 40A. In other implementations, the head contact piece 314 may comprise a rigid material, or a combination of soft and hard materials. For example, a rigid inner component may be coated with an elastomer.

An earpiece 316 may extend from a portion of the temple 308 that is distal to the front frame 206. The earpiece 316 may comprise a material that may be reshaped to accommodate the anatomy of the head 104 of the user 102. For example, the earpiece 316 may comprise a thermoplastic that may be warmed to a predetermined temperature and reshaped. In another example, the earpiece 316 may comprise a wire that may be bent to fit. The wire may be encased in an elastomeric material.

Figure 4:
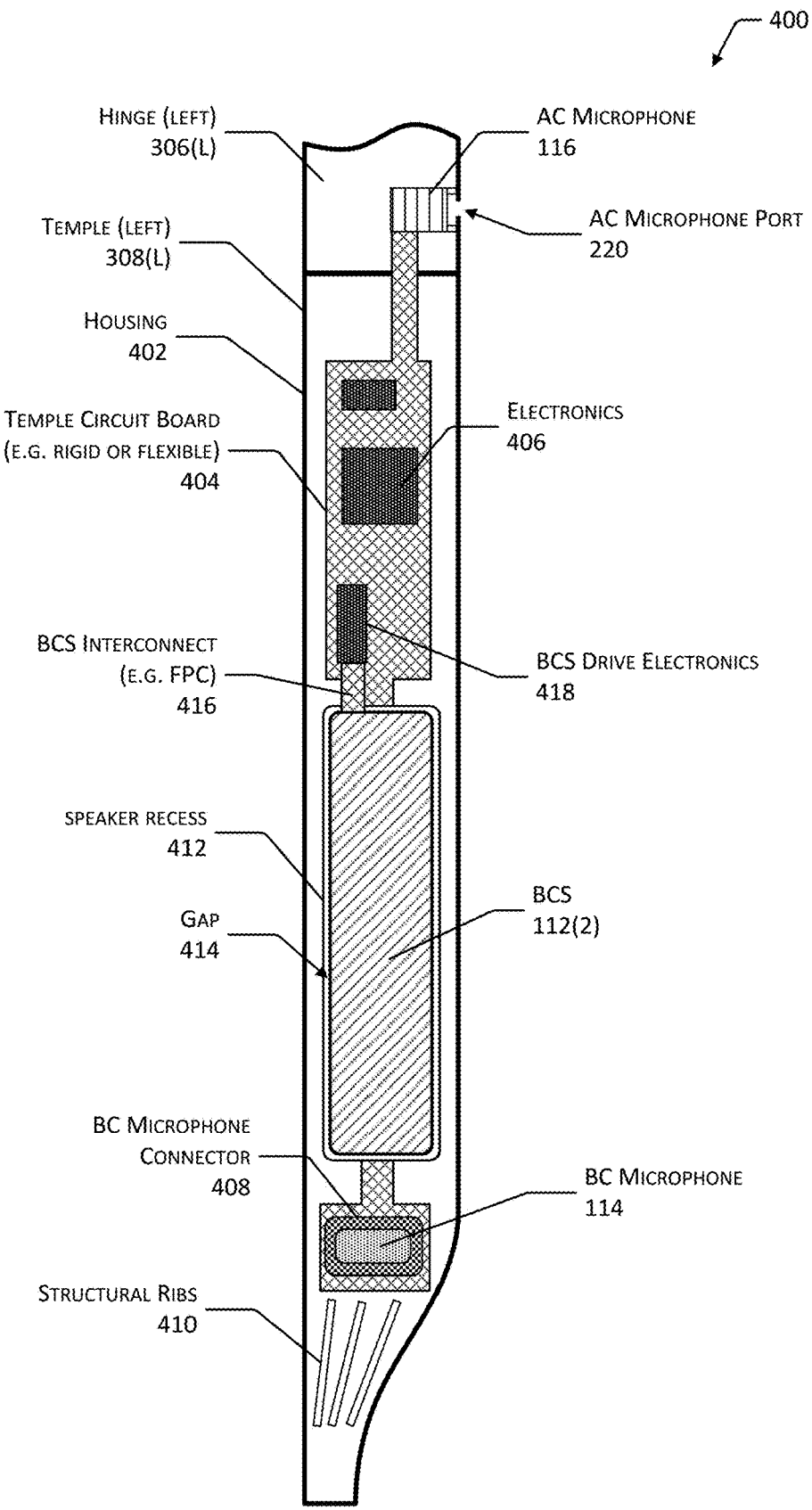
FIG. 4 depicts some of the internal components of a temple of a head-mounted wearable device including a BCS, according to some implementations.

FIG. 4 depicts 400 some of the internal components of a left temple 308(L) of a HMWD 106 including a BCS 112, according to some implementations. The depiction of the left temple 308(L) is provided by way of example and not necessarily as a limitation. For example, the same or similar structures as described herein may be installed in the right temple 308(R).

A portion of the hinge 306 is depicted. Arranged within the hinge 306 is AC microphone 116. An AC microphone port 220 for the AC microphone 116 in the hinge 306 is depicted. The AC microphone port 220 may open generally downwards. For example, the aperture of the AC microphone port 220 may be on a bottom surface of the hinge 306 and may open towards the feet of the user 102 during normal wear.

As described above, the hinge 306 is coupled to a temple 308. The temple 308 may comprise a housing 402. The housing 402 may comprise one or more elements that serve to enclose at least a portion of the temple 308. The housing 402 may comprise a plastic, metal, ceramic, composite material, and so forth.

A temple circuit board 404 is depicted. The temple circuit board 404 may comprise a rigid or flexible circuit board. For example, the temple circuit board 404 may comprise a flexible printed circuit. In some implementations, the temple circuit board 404 may extend at least partially into the hinge 306. For example, the AC microphone 116 may be connected to the temple circuit board 404.

Electronics 406 may be connected to, affixed to, or otherwise in communication with the temple circuit board 404. For example, integrated circuits may be laminated to the temple circuit board 404.

A BC microphone connector 408 may be affixed to the temple circuit board 404. For example, a pressure sensitive adhesive (PSA) may be used to join the temple circuit board 404 and the BC microphone connector 408. In some implementations, the BC microphone connector 408 may comprise a flexible or elastomeric material into which the BC microphone 114 may be emplaced. In the implementation depicted here, the BC microphone 114 is located proximate to the distal end of the temple 308 and is thus closer to the earpiece 316 than the BCS 112.

Depicted in this illustration are structural ribs 410. The structural ribs 410 may be used to add rigidity to a distal portion of the temple 308. The structural ribs 410 may also improve structural support for the earpiece 316 (not shown).

Also depicted is a BCS 112. The BCS 112 may be emplaced at least partially within a speaker recess 412. The speaker recess 412 extends within the housing 402 of the temple 308. When mounted within, the BCS 112 is affixed to a bottom of the speaker recess 412 and a gap 414 around a perimeter of the BCS 112 and one or more walls of the speaker recess 412 is maintained. By providing this mechanical separation from the sides of the BCS and the housing 402, attenuation due to mechanical coupling between the housing 402 and the BCS 112 is minimized. As a result, output amplitude is increased, providing a greater range of available volume for the user 102.

The BCS 112 is connected via a BCS interconnect 416 to BCS drive electronics 418. The BCS interconnect 416 may comprise a flexible printed circuit 222, wiring harness, and so forth to provide an electrical connection between the BCS 112 and the BCS drive electronics 418. In some implementations the BCS interconnect 416 may span the gap 414. In other implementations, the BCS interconnect 416 may comprise circuit traces arranged on the bottom of the speaker recess 412, and the bottom of the BCS 112 may utilize corresponding conductive pads to establish an electrical connection.

Figure 5:
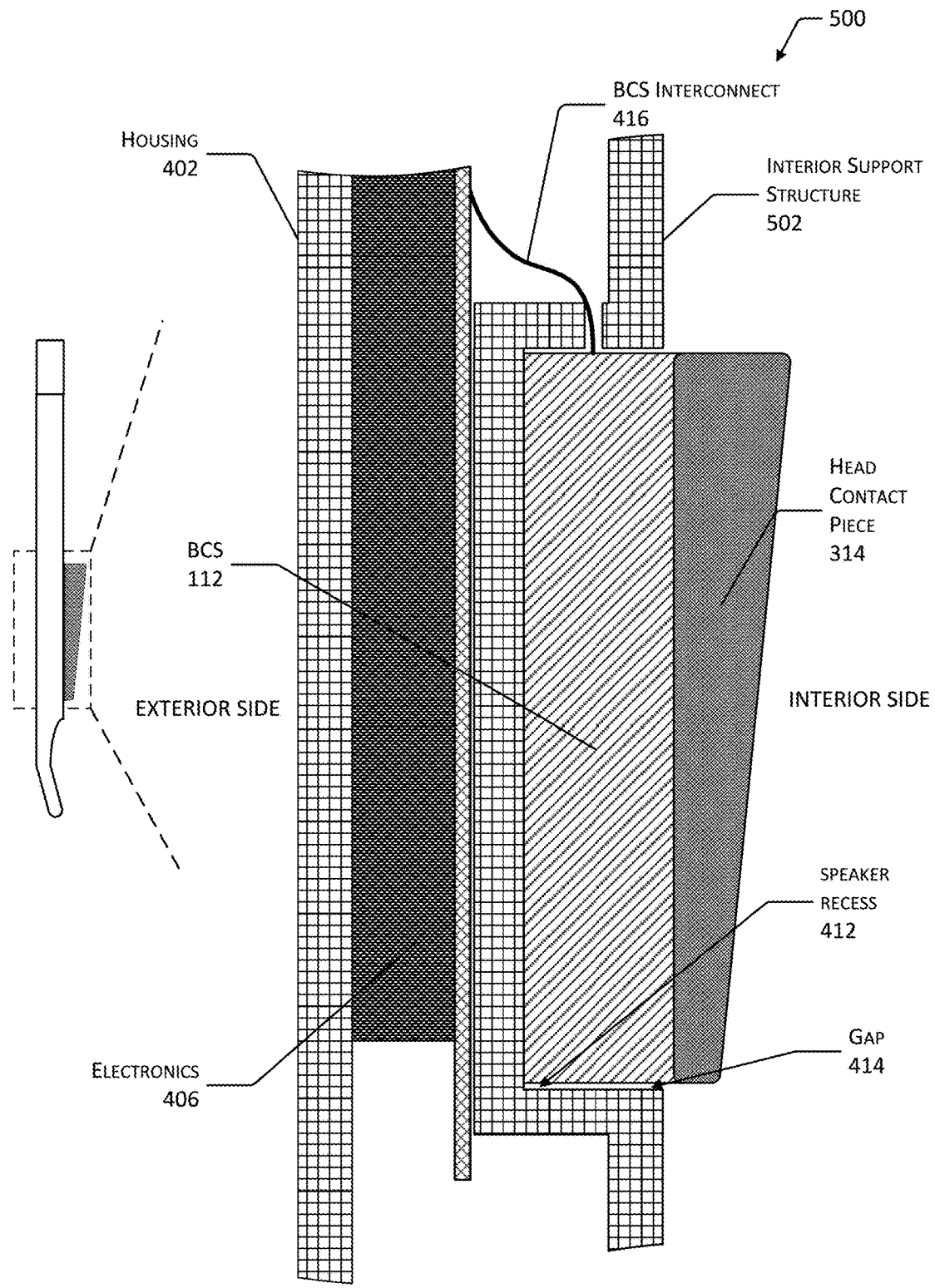
FIG. 5 depicts an enlarged view of a portion of the interior structure of a temple including the mounting of the BCS, according to some implementations.

FIG. 5 depicts an enlarged view 500 of a portion of the interior structure of a temple 308 including the mounting of the BCS 112, according to some implementations.

As described above with regard to FIG. 4, a speaker recess 412 is present in the housing 402. The BCS 112 is emplaced within the speaker recess 412. A bottom surface of the BCS 112 is in contact with a bottom of the speaker recess 412. The BCS 112 may be joined to the speaker recess 412 using an adhesive, fastener, mechanical interference fit, and so forth.

The gap 414 is maintained between the perimeter of the BCS 112 and walls of the speaker recess 412. Also shown affixed to an interior side of the BCS 112 is a head contact piece 314. In some implementations the head contact piece 314 may be omitted if the surface of the BCS 112 that is in contact with the head 104 provides sufficient mechanical coupling.

Figure 6:
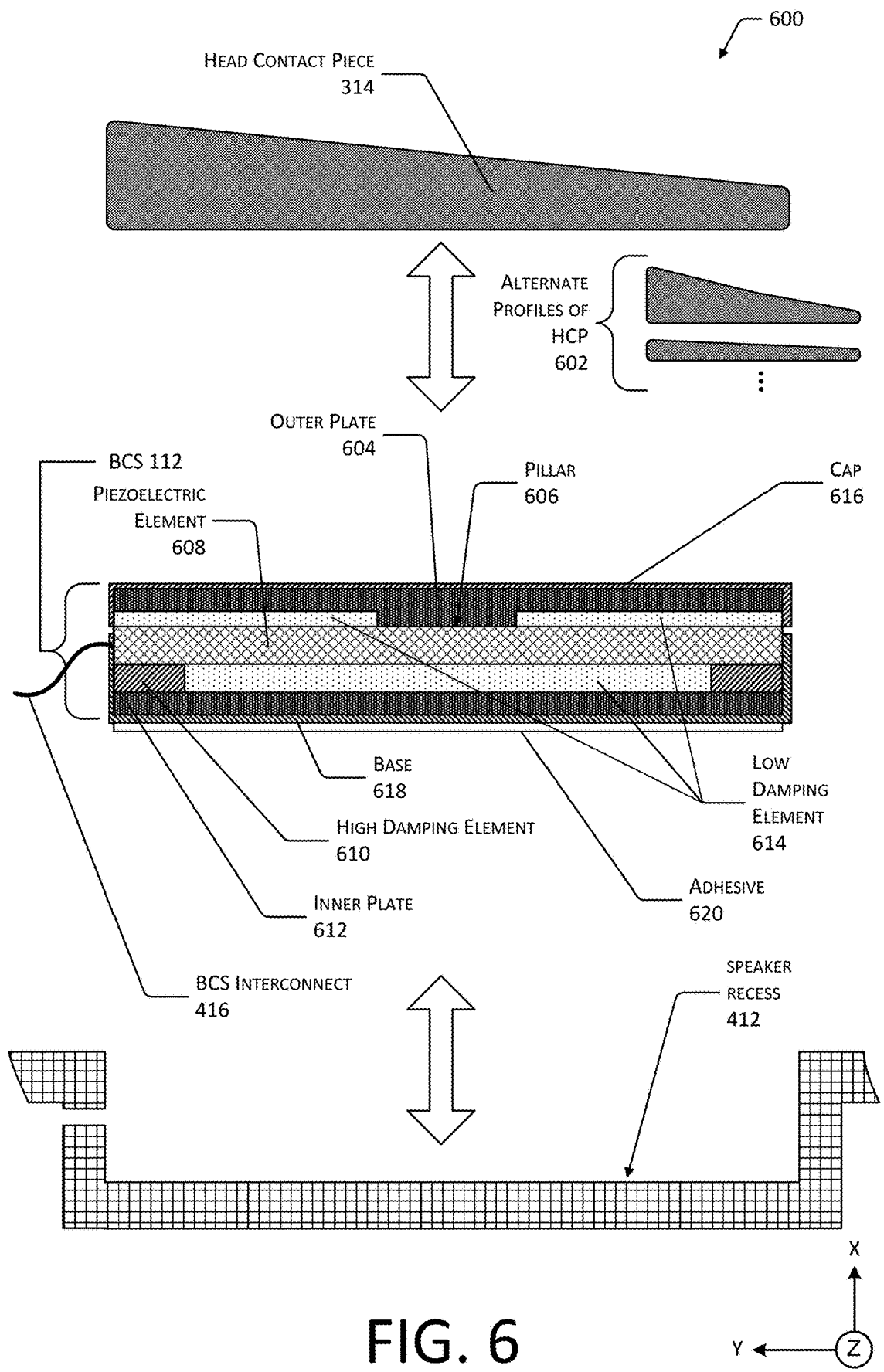
FIG. 6 depicts a cross sectional view of the BCS, according to some implementations.

FIG. 6 depicts a cross sectional view 600 of the BCS 112, according to some implementations.

As described above, the head contact piece 314 may be affixed to the BCS 112. The head contact piece 314 may exhibit a variety of different profiles. Depicted are a few alternate profiles 602 of the head contact piece. For example, the head contact piece 314 may be concave, may be thinner, and so forth.

The BCS 112 may comprise several elements. An outer plate 604 is proximate to the user 104 during normal use. The outer plate 604 may be substantially rigid. The outer plate 604 may be constructed of at least one or more of metal, fiberglass, carbon fiber, or ceramic. For example, the outer plate 604 may comprise G-10 fiberglass board.

In some implementations the head contact piece 314 may be integral with a portion of the BCS 112. For example, the outer plate 604 may be formed to include the head contact piece 314.

The outer plate 604 may include one or more pillars 606. The pillar 606 provides a relative rigid or substantially incompressible structure that provides a conductive pathway for mechanical vibrations. For example, the pillar 606 may be an integral part of the outer plate 604. The pillar 606 is in contact with an electrically moveable element, such as the piezoelectric element 608 depicted here. As the piezoelectric element 608 moves, the resulting vibration is transferred to the outer plate 604. In some implementations the pillar 606 may be in contact with an area that is in the center of the piezoelectric element 608. In other implementations, the pillar 606 may be in contact with other portions of the piezoelectric element 608. For example, where the piezoelectric element 608 involves a cantilevered element, the pillar 606 may be in contact with a free end of the cantilevered element.

The electrically moveable element may comprise one or more of a piezoelectric material, an electromagnetic coil, or an electroactive polymer. The electrically moveable element produces a mechanical displacement responsive to a signal. For example, the piezoelectric element 608 will change physical shape responsive to an applied voltage.

At least a portion of the piezoelectric element 608 is in contact with one or more high damping elements 610. For example, the high damping element 610 may be arranged around at least a portion of a perimeter of the piezoelectric element 608. With this arrangement, the center of the piezoelectric element 608 is unconstrained by the high damping element 610 and may move relatively freely. In another example, the high damping element 610 may be arranged at each end of the piezoelectric element 608, allowing the center to be unconstrained. The high damping element 610 may comprise a high damping rubber that provides attenuation of mechanical vibration. The high damping element 610 provides mechanical support while providing some attenuation to minimize transfer of mechanical vibration between the temple 308 or elements thereof and the BCS 112. For example, the high damping rubber may provide some support in compression while permitting shearing motions. In some implementations the high damping element 610 may comprise a material exhibiting a Shore A durometer hardness of greater than 50. The high damping element 610 may comprise a material with a high damping coefficient.

An inner plate 612 is in contact with the high damping element 610 on a side opposite the piezoelectric element 608. The inner plate 612 may be substantially rigid, and may be constructed of at least one or more of metal, fiberglass, carbon fiber, or ceramic.

One or more low damping elements 614 may be arranged in at least some of the spaces between the elements described above. For example, the low damping element may comprise one or more pieces of an acoustic foam such as polyurethane foam, soft silicone material, or other materials having a Shore A durometer hardness of less than 50. The low damping element 614 may comprise a material with a low damping coefficient.

A first low damping element 614 may be arranged between the underside of the outer plate 604 and the upper surface of the piezoelectric element 608. A hole in the low damping element 614 may permit unimpeded passage of the pillar 606 to maintain contact with the piezoelectric material 608.

A second low damping element 614 may be arranged between the underside of the piezoelectric element 608 and the upper surface of the inner plate 612. This second low damping element 614 may be placed within the perimeter formed by the high damping element 610.

Some electrically moveable elements may exhibit very sharp resonance peaks. For example, the piezoelectric element 608 may exhibit peak resonance for a very narrow bandwidth. As a result, the audio output produced by the piezoelectric element 608 may not reproduce sounds with a desired fidelity. By utilizing the low damping element 614 in the BCS 112, the resonance peak of the piezoelectric element 608 is broadened. As a result, the quality of the audio produced is improved.

The low damping element 614 also provides mechanical support for the components of the BCS 112. For example, if excessive force is applied to the outer plate 604, the low damping element 614 within the BCS 112 may minimize or prevent damage to the piezoelectric material 608 due to mechanical overstressing.

In some implementations one or more of the high damping element 610 or the low damping element 614 may be molded or formed to another structure. For example, the high damping element 610 may be molded onto the inner plate 612.

In other implementations one or more of the interior spaces of the BCS 112 may omit the low damping element 614. For example, the first low damping element 614 between the outer plate 604 and the piezoelectric element 608 may be omitted.

In some implementations the BCS 112 may include a cap 616. The cap 616 may be a separate piece that is proximate to the outer plate 604, or may be integral with the outer plate 604. For example, the outer plate 604 may have walls that extend downward from a perimeter towards the inner plate 612. In some implementations the BCS 112 may include a base 618. The base 618 may be a separate piece that is proximate to the inner plate 612, or may be integral with the inner plate 612. For example, the inner plate 612 may have walls that extend upward from a perimeter towards the outer plate 604. The inner plate 612 may be joined to the high damping element 610 using an adhesive.

The cap 616 and the base 618 may either be separated by a gap, or may overlap one another. For example, the walls of the cap 616 may extend to at least partially overlap the walls of the base 618. In some implementations a flexible material such as a polymer sheet may be used to seal the gap between the cap 616 and the base 618.

An adhesive 620 may be arranged between the bottom of the BCS 112, that is on the underside of the base 618, and the bottom of the speaker recess 412. When joined, the adhesive 620 may maintain the BCS 112 within the speaker recess 412.

In some implementations one or more elements of the BCS 112 may be omitted. For example, the inner plate 612 and the adhesive 620 may be omitted, and one or more of the high damping element 610 or the second low damping element 614 may be used to provide a mechanical bond between the BCS 112 to the speaker recess 412. For example, the damping material may be inherently adhesive, may be coated with an adhesive, may be suitable for molding or lamination, and so forth.

In some implementations one or more of the elements in the BCS 112 may be laminated, adhered, welded, or otherwise joined to one another. For example, the high damping element 610 may also act as an adhesive, joining the piezoelectric element 608 and the inner plate 612.

The use of one or more of the high damping element 610 or the low damping element 614 may also improve user 102 comfort. For example, when the BCS 112 is used without the head contact piece 314, the damping material may allow the BCS 112 to conform at least partially to the side of the head 104.

Figure 7:
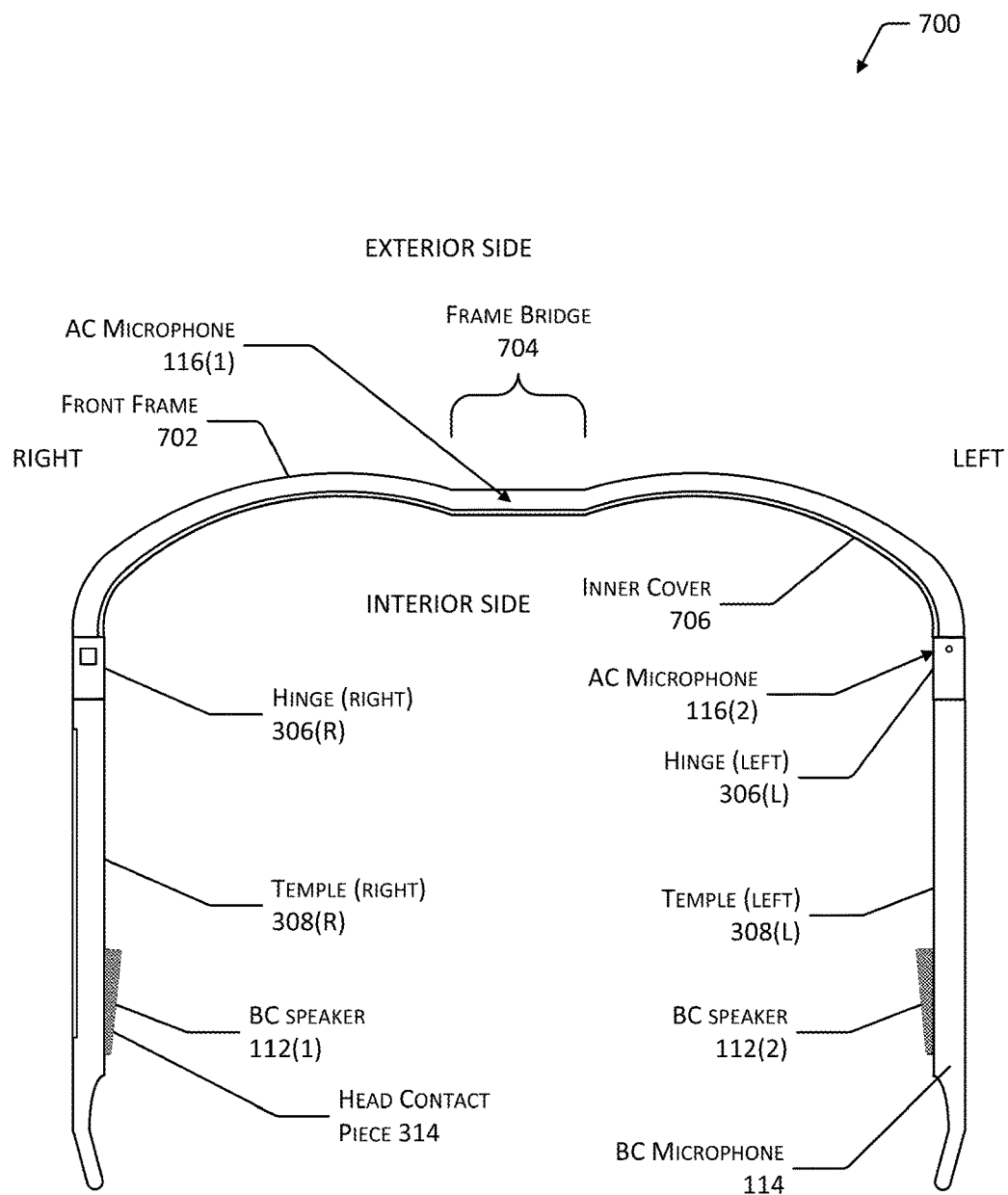
FIG. 7 depicts an exterior view, from below, of the head-mounted wearable device in an unfolded configuration that utilizes an inner cover, according to some implementations.

FIG. 7 depicts an exterior view 600, from below, of the HMWD 106 in an unfolded configuration that utilizes an inner cover, according to another implementation. In this implementation, the HMWD 106 may utilize a front frame 702 that provides integral support for one or more of the lenses 108. Similar to the front frame 206 described above, the front frame 702 may include a frame bridge 704 that joins a left brow section and a right brow section.

The front frame 702 may have an interior side that is proximate to the user 102 during normal wear, and an exterior side that is opposite the interior side. The interior side of the front frame 702 may be open, allowing for the assembly of the HMWD 106 by insertion of the FPC 222, sensors such as the AC microphone 116, and so forth within the front frame 702. Once ready for final assembly, an inner cover 706 may be joined to the interior side of the front frame 702. The inner cover 706 provides concealment and protection for the structures and components within the front frame 702.

As described above, the temples 308 may include BCSs 112. Corresponding head contact pieces 314 may be utilized to improve fit of the BCS 112 to a particular user 102.

Figure 8:
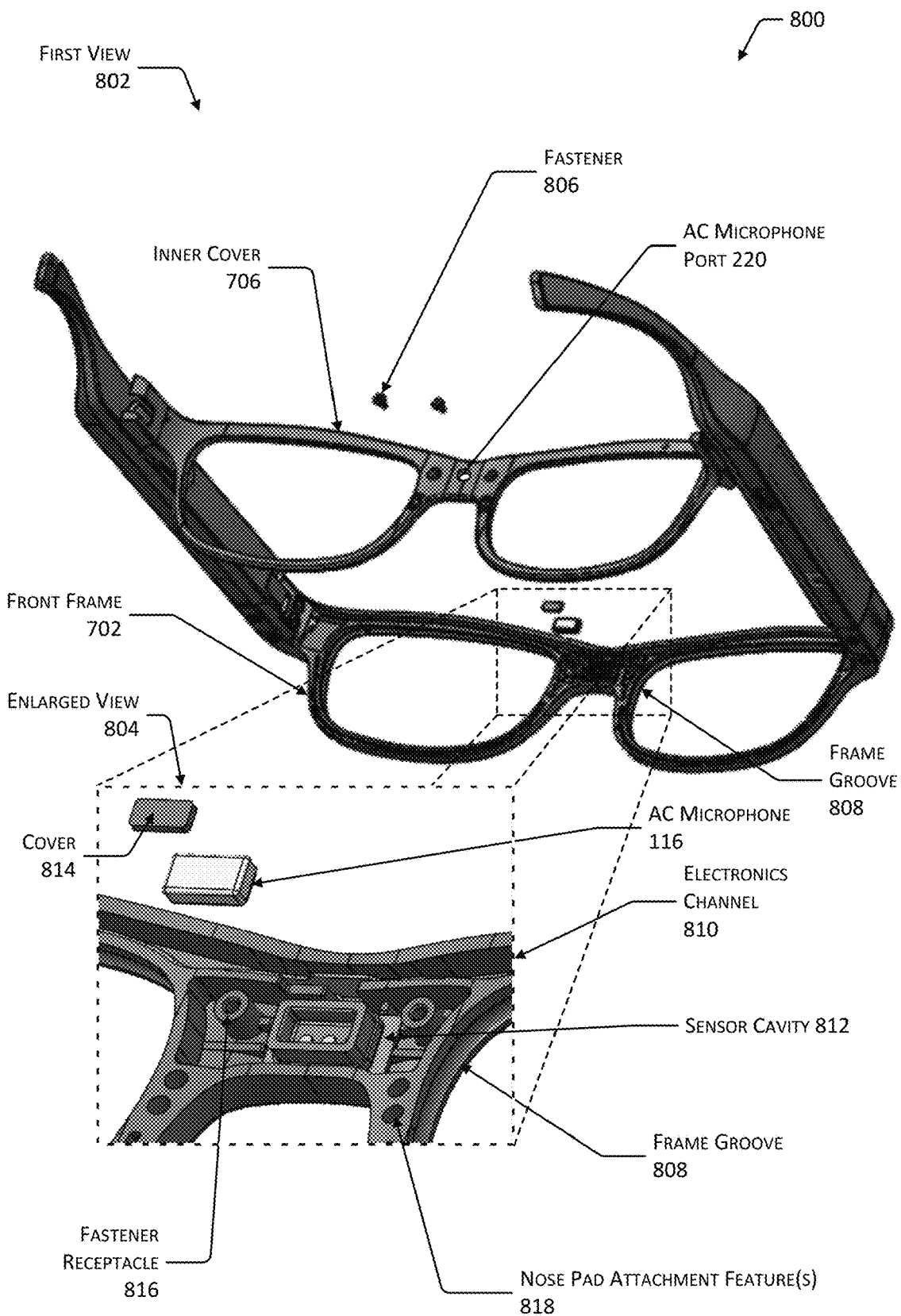
FIG. 8 depicts views of the implementation of FIG. 7, including the front frame with a sensor cavity for placement of the AC microphone and the inner cover with an AC microphone port, according to some implementations.

FIG. 8 depicts views 800 of the implementation of FIG. 7, including the front frame 702 and the inner cover 706. A first view 802 shows a rendering of the front frame 702 prior to the inner cover 706 being joined to the interior side of the front frame 702. An enlarged view 804 provides additional details with regard to the frame bridge 704.

In the first view 802, we see a pair of fasteners 806, such as screws that may be used to join the inner cover 706 to the front frame 702. In addition to, or instead of, the screws other techniques may be used to join the inner cover 706 to the front frame 702. For example, mechanical features such as an engagement slot on the front frame 702 and a corresponding engagement ridge along the inner cover 706, or vice versa, may provide for alignment. An adhesive may be placed in the engagement slot to affix the inner cover 706 to the front frame 702.

Depicted on the front frame 702 are frame grooves 808 for each of the respective lenses 108. In the enlarged view 804, the frame groove 808 for the right lens 108 is visible. The walls of the frame groove 808 provide mechanical interference features that maintain engagement of the lens 108 within the front frame 702. During assembly of the HMWD 106, the lenses 108 may be inserted into the front frame 702 before the inner cover 706 is affixed.

Fabrication of the front frame 702 may utilize injection molding techniques. In one implementation, the front frame 702 may comprise a unitary piece of plastic that is formed using injection molding. To form the edges of the frame groove 808, a collapsible insert may be utilized. During the injection molding process, the collapsible insert is expanded to provide a physical structure against which the plastic may be molded to form the frame groove 808.

Also, depicted within the enlarged view 804 is an electronics channel 810. The electronics channel 810 may provide a passageway through which the FPC 222 may be arranged. The electronics channel 810 may extend from the left hinge 306(L) to the right hinge 306(R).

A sensor cavity 812 may be located within the frame bridge 704 of the front frame 702. The sensor cavity 812 provides a volume within which one or more sensors may be arranged. For example, the AC microphone 116 may be emplaced within the sensor cavity 812. The sensor cavity 812 may be in communication with the electronics channel 810. For example, an opening between the electronics channel 810 and the sensor cavity 812 may allow for the FPC 222 to extend within sensor cavity 812. The AC microphone 116 may include other components, such as a cover 814. The cover 814 may comprise a piece of cloth, foam, or other material that allows the transmission of sound vibrations while minimizing the impact of wind on the AC microphone 116, reducing ingress of contaminants, and so forth.

The frame bridge 704 may include one or more fastener receptacles 816. For example, the fastener receptacles 816 may be threaded holes within which a screw may be inserted.

Frame bridge 704 may include one or more nose pad attachment features 818. For example, the nose pad attachment feature 818 may include cavities within which one or more members of the nose pad 218 may be inserted. In some implementations, an adhesive or mechanical interference fit may be used to maintain the nose pad 218 within the nose pad attachment feature 818.

Figure 9:
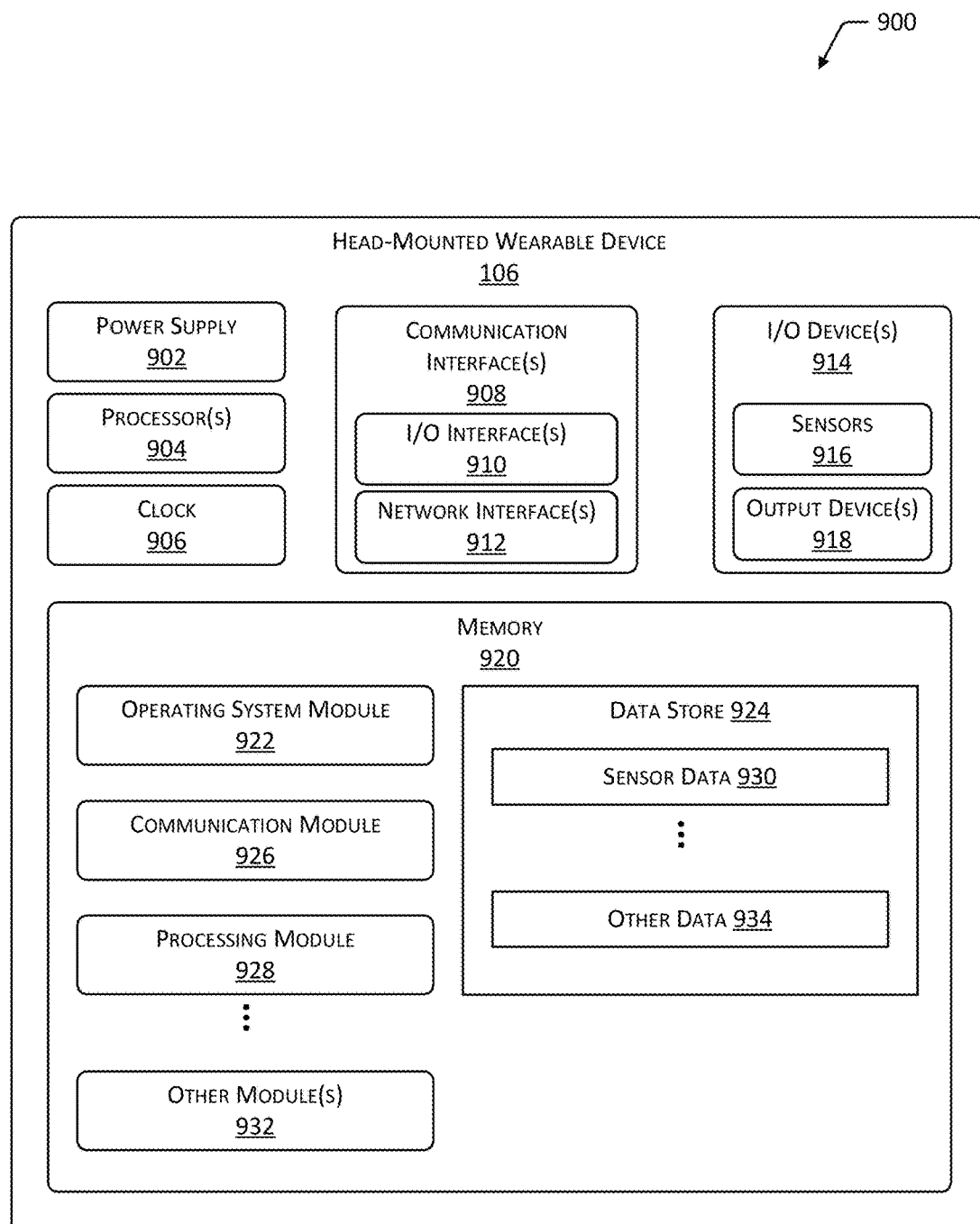
FIG. 9 is a block diagram of electronic components of the head-mounted wearable device, according to some implementations.

FIG. 9 is a block diagram 900 of components of the head-mounted wearable device 106, according to some implementations.

One or more power supplies 902 may be configured to provide electrical power suitable for operating the components in the HMWD 106. The one or more power supplies 902 may comprise batteries, capacitors, fuel cells, photovoltaic cells, wireless power receivers, conductive couplings suitable for attachment to an external power source such as provided by an electric utility, and so forth. For example, the batteries on board the HMWD 106 may be charged wirelessly, such as through inductive power transfer. In another implementation, electrical contacts may be used to recharge the HMWD 106.

The HMWD 106 may include one or more hardware processors 904 (processors) configured to execute one or more stored instructions. The processors 904 may comprise one or more cores. The processors 904 may include general purpose microprocessors, microcontrollers, application specific integrated circuits (ASICs), digital signal processors (DSPs), and so forth. One or more clocks 906 may provide information indicative of date, time, ticks, and so forth. For example, the processor 904 may use data from the clock 906 to associate a particular interaction with a particular point in time.

The HMWD 106 may include one or more communication interfaces 908 such as input/output (I/O) interfaces 910, network interfaces 912, and so forth. The communication interfaces 908 enable the HMWD 106, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include sensors 916. The sensors 916 may include but are not limited to, the AC microphone 116, the BC microphone 114, the touch sensor 310, the button 312, a camera, a proximity sensor, a barometer, a light sensor, an inertial measurement unit, a magnetometer, and so forth. The I/O devices 914 may also include output devices 918. The output devices 918 may include but are not limited to display lights, graphical displays, BCSs 112, haptic output devices, air conduction speakers, and so forth. The display lights may comprise one or more light-emitting diodes, quantum dots, incandescent lamps, electroluminescent materials, and so forth. When activated, a display light emits light. One or more display lights may be positioned within the field of view of the user 102 while the HMWD 106 is worn on the head 104. For example, one or more display lights may be arranged just above one or both lenses 108 of the HMWD 106, such as on the front frame 206 or the front frame 702.

In some embodiments, the I/O devices 914 may be physically incorporated with the HMWD 106 or may be externally placed. The output devices 918 are configured to generate signals, which may be perceived by the user 102 or may be detected by sensors 916.

The network interfaces 912 may be configured to provide communications between the HMWD 106 and other devices, such as the server 118. The network interfaces 912 may include devices configured to couple to personal area networks (PANs), wired or wireless local area networks (LANs), wide area networks (WANs), and so forth. For example, the network interfaces 912 may include devices compatible with Ethernet, Wi-Fi, Bluetooth, Bluetooth Low Energy, ZigBee, and so forth.

The HMWD 106 may also include one or more busses or other internal communications hardware or software that allow for the transfer of data between the various modules and components of the HMWD 106.

As shown in FIG. 9, the HMWD 106 includes one or more memories 920. The memory 920 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 920 provides storage of computer-readable instructions, data structures, program modules, and other data for the operation of the HMWD 106. A few examples of functional modules are shown stored in the memory 920, although the same functionality may alternatively be implemented in hardware, firmware, or as a system on a chip (SoC).

The memory 920 may include at least one operating system (OS) module 922. The OS module 922 is configured to manage hardware resource devices such as the I/O interfaces 910, the I/O devices 914, the communication interfaces 908, and provide various services to applications or modules executing on the processors 904. The OS module 922 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 920 may be a data store 924 and one or more of the following modules. These modules may be executed as foreground applications, background tasks, daemons, and so forth. The data store 924 may use a flat file, database, linked list, tree, executable code, script, or other data structure to store information. In some implementations, the data store 924 or a portion of the data store 924 may be distributed across one or more other devices including servers 120, network attached storage devices, and so forth.

The communication module 926 may be configured to establish communications with one or more of the computing devices 110, other HMWDs 106, servers 120, sensors 916, or other devices. The communications may be authenticated, encrypted, and so forth.

The processing module 928 may use sensor data 930 to determine user inputs, determine information about the environment around the HMWD 106, and so forth. For example, the sensor data 930 may comprise audio output data generated by one or more of the AC microphone 116, the BC microphone 114, and so forth.

During operation of the system the data store 924 may store the sensor data 930 or other data at least temporarily, in the data store 924.

Techniques such as artificial neural networks (ANN), active appearance models (AAM), active shape models (ASM), principal component analysis (PCA), classifiers, cascade classifiers, and so forth, may also be used to process data.

Other modules 932 may also be present in the memory 920 as well as other data 934 in the data store 924. For example, the other modules 932 may include a contact management module while the other data 934 may include address information associated with a particular contact, such as an email address, telephone number, network address, uniform resource locator, and so forth.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A head-mounted wearable device comprising:
    a front frame comprising a first hinge and a second hinge;
    a first temple connected to the first hinge, wherein the first temple comprises a first speaker recess;
    a second temple connected to the second hinge, wherein the second temple comprises a second speaker recess;
    a first bone conduction speaker mounted within the first speaker recess;
    a second bone conduction speaker mounted within the second speaker recess; and
    wherein the first bone conduction speaker and the second bone conduction speaker each comprises:
        an outer plate having a centrally located pillar;
        a piezoelectric element having a center that is in contact with the centrally located pillar;
        a first low damping element arranged between the outer plate and the piezoelectric element other than the centrally located pillar;
        a high damping element in contact with at least a portion of a perimeter of the piezoelectric element;
        an inner plate in contact with the high damping element;
        a second low damping element arranged between the piezoelectric element and the inner plate other than the high damping element; and
        an adhesive material between at least a portion of the inner plate and one of the first speaker recess or the second speaker recess.

2. The head-mounted wearable device of claim 1, further comprising:
    a first head contact piece coupled to the first bone conduction speaker;
    a second head contact piece coupled to the second bone conduction speaker; and
    wherein the first head contact piece and the second head contact piece each comprises:
        an elastomeric member that is wedge shaped in cross section, the elastomeric member having a thickest point proximate to the front frame and a thinnest point distal to the front frame.

3. The head-mounted wearable device of claim 1, wherein the first low damping element and the second low damping element comprise an acoustic foam and the high damping element comprises a high damping rubber.

4. A head-mounted wearable device comprising:
    a first structure of the head-mounted wearable device having a recess;
    a bone conduction speaker device mounted within the recess, the bone conduction speaker device comprising:
        an outer plate;
        an electrically moveable element in contact with at least a portion of the outer plate;
        a low damping element arranged between the outer plate and at least a portion of the electrically moveable element, wherein the low damping element broadens a resonance peak of the electrically moveable element; and a high damping element in contact with the at least a portion of a perimeter of the electrically moveable element.

5. The head-mounted wearable device of claim 4, wherein the high damping element is adhered to a surface of the recess.

6. The head-mounted wearable device of claim 4, wherein the high damping element is in contact with the at least a portion of the perimeter of the electrically moveable element and not in contact with a central area of the electrically moveable element; and the bone conduction speaker device further comprising:
an inner plate in contact with the high damping element; and
wherein the inner plate is affixed to a surface within the recess.

7. The head-mounted wearable device of claim 4, wherein the electrically moveable element comprises one or more of a piezoelectric material, an electromagnetic coil, or an electroactive polymer.

8. The head-mounted wearable device of claim 4, the bone conduction speaker device further comprising a cap proximate to or integral with the outer plate.

9. The head-mounted wearable device of claim 4, wherein the high damping element is in contact with the at least a portion of the perimeter of the electrically moveable element; and the bone conduction speaker device further comprising:
an inner plate in contact with the high damping element, the inner plate proximate to or integral with a base of the bone conduction speaker device.

10. The head-mounted wearable device of claim 4, wherein the low damping element comprises one or more pieces of acoustic foam.

11. The head-mounted wearable device of claim 10, wherein the high damping element comprises one or more pieces of a high damping rubber.

12. The head-mounted wearable device of claim 4, wherein the outer plate is constructed of at least one or more of metal, fiberglass, carbon fiber, or ceramic.

13. The head-mounted wearable device of claim 4, wherein the outer plate further comprises a pillar that is in contact with the electrically moveable element.

14. The head-mounted wearable device of claim 4, wherein the bone conduction speaker device is affixed to a bottom of the recess and further comprising a gap between one or more walls of the recess and one or more sides of the bone conduction speaker device.

15. The head-mounted wearable device of claim 4, further comprising:
a head contact piece coupled to the outer plate, the head contact piece comprising a wedge having a thickest point proximate to a front of the head-mounted wearable device and a thinnest point distal to the front.

16. The head-mounted wearable device of claim 15, further comprising:
one or more of a magnet or magnetically receptive material configured to magnetically retain the head contact piece in a position that is proximate to the outer plate.

17. The head-mounted wearable device of claim 15, further comprising:
electronics configured to deliver a signal to the electrically moveable element that causes movement of the electrically moveable element; and
one or more wires that provide an electrical connection between the electronics and the electrically moveable element.

18. A head-mounted wearable device comprising:
a bone conduction speaker comprising:
an outer plate having one or more pillars;
a piezoelectric element that is in contact with the one or more pillars;
a first low damping element comprising an acoustic foam and arranged between the outer plate and the piezoelectric element;
a high damping element in contact with at least a portion of a perimeter of the piezoelectric element, wherein the high damping element reduces vibrations between the bone conduction speaker and one or more components of the head-mounted wearable device;
an inner plate in contact with the high damping element; and
a second low damping element arranged between the piezoelectric element and the inner plate.

19. The head-mounted wearable device of claim 18, further comprising:
a wedge shaped member affixed to the outer plate, wherein the wedge shaped member comprises an elastomer.

20. The head-mounted wearable device of claim 18, wherein the second low damping element comprises a second acoustic foam and the high damping element comprises a high damping rubber.

* * * * *